United States Patent
Lin et al.

(10) Patent No.: US 12,481,082 B1
(45) Date of Patent: Nov. 25, 2025

(54) HIGH-EFFICIENCY AND HIGH SIGNAL-TO-NOISE RATIO SURFACE NUCLEAR MAGNETIC RESONANCE DETECTION METHOD

(71) Applicant: Jilin University, Changchun (CN)

(72) Inventors: Tingting Lin, Changchun (CN); Xing Gao, Changchun (CN); Yujing Yang, Changchun (CN); Weihao Yang, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 19/084,714

(22) Filed: Mar. 19, 2025

(30) Foreign Application Priority Data

Sep. 30, 2024 (CN) .......................... 202411375133.7

(51) Int. Cl.
*G01V 3/14* (2006.01)
*G01N 24/08* (2006.01)
*G01R 33/44* (2006.01)

(52) U.S. Cl.
CPC ............. *G01V 3/14* (2013.01); *G01N 24/081* (2013.01); *G01R 33/445* (2013.01)

(58) Field of Classification Search
CPC .. G01R 33/341; G01R 33/246; G01R 33/243; G01R 33/56; G01R 33/445; G01V 3/14; G01N 24/081; G01N 24/08
See application file for complete search history.

(56) References Cited

U.S. PATENT DOCUMENTS

2019/0107590 A1   4/2019   Fukushima
2023/0132047 A1   4/2023   Walsh

FOREIGN PATENT DOCUMENTS

CN   107942397 A   4/2018
CN   109031435 B   12/2018
CN   116953805 A   10/2023

OTHER PUBLICATIONS

Lin, Tingting, et al. "Surface magnetic-field enhancement technology with a double-polarization coil for urban hydrology quantitative survey." IEEE Transactions on Geoscience and Remote Sensing 60 (2021): 1-11. (Year: 2021).*

(Continued)

*Primary Examiner* — Rishi R Patel
(74) *Attorney, Agent, or Firm* — JEEN IP LAW, LLC (57) ABSTRACT

A high-efficiency and high signal-to-noise ratio surface nuclear magnetic resonance detection method is provided. The present disclosure adopts a concentric arrangement of a direct current transmitting coil and an alternating current transmitting coil to form a transmitting coil group, replacing the traditional single alternating current transmitting coil. Through the change of magnetization intensity caused by alternating excitation, the direct current emission time, alternating current emission time and emission interval time are adjusted, and the magnetization intensity is controlled to be gradually accumulated and stabilized in a certain range, thus improving the macro magnetization vector of hydrogen atoms. The single pulse emission time of the alternating excitation emission mode provided by the present disclosure is within 1 second, which can effectively improve the detection efficiency. The present disclosure achieves the effect of simultaneously improving the signal-to-noise ratio of surface nuclear magnetic resonance detection signals and enhancing detection efficiency.

3 Claims, 6 Drawing Sheets

(56) References Cited

OTHER PUBLICATIONS

Yang, Yujing, et al. "Modeling of surface nuclear magnetic resonance based on prepolarization and its application in urban shallow measurements." IEEE Transactions on Geoscience and Remote Sensing 60 (2022): 1-10. (Year: 2022).*

Yang Yu-Jing, etc. "Numerical simulation and analyze of magnetic resonance sounding with adiabatic pulse for groundwater exploration" Acta Phys. Sin. vol. 69, No. 12, May 21, 2020 (May 21, 2020), pp. 1-9.

Liu Dan, Kong Li, Cheng Jingjing, Zhou Kaibo, "Design of the Signal Detection Module in Nuclear Magnetic Resonance Logging Instruments", China Petroleum Machinery, Issue 2, Feb. 10, 2007 (Feb. 10, 2007), full text.

* cited by examiner

HIGH-EFFICIENCY AND HIGH SIGNAL-TO-NOISE RATIO SURFACE NUCLEAR MAGNETIC RESONANCE DETECTION METHOD

CROSS-REFERENCE TO RELATED APPLICATIONS

This application claims priority to Chinese Patent Application No. 202411375133.7, filed on Sep. 30, 2024, which is hereby incorporated by reference in its entirety.

TECHNICAL FIELD

The present disclosure relates to the technical field of geophysical exploration, in particular to a high-efficiency and high signal-to-noise ratio surface nuclear magnetic resonance detection method.

BACKGROUND

Surface nuclear magnetic resonance groundwater detection method is a non-invasive geophysical method for directly detecting groundwater. The traditional surface nuclear magnetic resonance detection method uses the geomagnetic field as the background detection magnetic field, and uses an alternating current transmitting coil to emit radio frequency pulses to excite hydrogen atoms in groundwater to undergo magnetic resonance phenomenon, thereby detecting groundwater. However, this method has two problems: first, the signal-to-noise ratio is low, and in strong interference environments, the effective signal is easily overwhelmed by noise; second, the long pulse emission interval leads to low detection efficiency. A single measure point generally needs to emit more than 10 sets of detection pulses, so a single measure point usually takes several hours to detect, making it impossible to carry out large-scale regional surveys.

To address the problem of low signal-to-noise ratio in detection signals mentioned above, relevant practitioners have developed a pre-polarization method. This method increases the detection background field intensity by applying a direct current pre-polarization field before the detection pulse, which can significantly improve the detection signal amplitude compared to traditional methods. However, this method adds a pre-polarization pulse of 4-7 seconds or more on the basis of traditional methods, which reduces the detection efficiency. In response to the problem of low detection efficiency mentioned above, relevant practitioners have developed a steady-state pulse detection method. This method can significantly improve detection efficiency by shortening the pulse interval and reducing the emission time of a single set of pulses. However, this method only improves detection efficiency and does not improve the signal-to-noise ratio of signal. Therefore, in complex noise environments, effective signals are still difficult to extract.

At present, there is no method at home and abroad to simultaneously improve the signal-to-noise ratio and detection efficiency of surface nuclear magnetic resonance signals by adjusting the pulse time and interval of direct current emission and alternating current emission. Therefore, here is to provide a high-efficiency and high signal-to-noise ratio surface nuclear magnetic resonance detection method.

SUMMARY

The objective of the present disclosure is to provide a high-efficiency and high signal-to-noise ratio surface nuclear magnetic resonance detection method, aimed at solving the problems raised in the background mentioned above.

To achieve the above objective, the present disclosure provides the following technical solution:

A high-efficiency and high signal-to-noise ratio surface nuclear magnetic resonance detection method, the method is based on a set of transmitting coil group consisting of a direct current transmitting coil and an alternating current transmitting coil, and the direct current transmitting coil and the alternating current transmitting coil are arranged in a concentric pattern; the method includes the following steps:

Step 1: calculating a direct current pre-polarization magnetic field generated by the direct current transmitting coil in an underground space and a radio frequency excitation magnetic field generated by the alternating current transmitting coil in the underground space;

Step 2: calculating changes in underground magnetization intensity under an alternating action of direct current pre-polarization magnetic field and radio frequency excitation magnetic field;

Step 1 includes the following steps:

Step 11: calculating a magnetic field generated by a current passing through the coil;

Step 12: calculating an overall magnetic field generated by the coil; the direct current transmitting coil enhances a magnetization vector of hydrogen atoms in underground space by generating a constant magnetic field, while the alternating current transmitting coil flips a spin direction of underground hydrogen atoms by generating a radio frequency magnetic field;

Step 2 includes the following steps:

Step 21: calculating an enhancement of hydrogen atoms magnetization intensity by the direct current pre-polarization magnetic field;

Step 22: calculating a flipping effect of the radio frequency excitation magnetic field on hydrogen atoms;

Step 23: calculating changes in underground magnetization intensity: based on the different direct current emission current times and alternating current emission current times set, calculating a degree of enhancement of underground magnetization intensity by the direct current pre-polarization magnetic field and the flipping of hydrogen atoms by the radio frequency excitation magnetic field, and obtaining a curve of underground magnetization intensity changes; by adjusting direct current emission time, alternating current emission time, and emission interval time, controlling the magnetization intensity to gradually accumulate and stabilize within a certain range.

Further, steps 11 and 12 are as follows:

Step 11: calculating a magnetic field distribution according to Biot-Savart law, a magnetic field formed by an edge current at any point r in space in the direct current transmitting coil with a side length of 2a is expressed as:

$$|B_{P_r}| = \frac{\mu_0 I_P}{4\pi a}(\cos\theta_r - \cos\theta_r')$$

Wherein, $B_{P_r}$ is a pre-polarization magnetic field intensity at point r in space, $\mu_0$ is a magnetic permeability, $I_P$ is an excitation current of the direct current pre-polarization magnetic field, and $\theta_r$ and $\theta_r'$ are angles between point r and two ends of a wire;

A magnetic field formed by an edge current at any point r in space in the alternating current transmitting coil with a side length of 2c is expressed as:

$$|B_{Ar}| = \frac{\mu_0 I_A}{4\pi c}(\cos\alpha - \cos\alpha'_r)$$

Wherein, $B_{Ar}$ is an excitation field intensity at point r in space, $I_A$ is an excitation current of the radio frequency excitation magnetic field, and $\alpha$ and $\alpha_r'$ are angles between point r and two ends of the wire;

Step 12: based on a result calculated in step 11, represent the direct current pre-polarization magnetic field excited by the direct current transmitting coil at a point r underground as:

$$B_{Prx}=B_{Pr1}+B_{Pr3}=e_{xr}\times I_P$$

$$B_{Pry}=B_{Pr2}+B_{Pr4}=e_{yr}\times I_P$$

$$B_{Prz}=B_{Pr1}+B_{Pr2}+B_{Pr3}+B_{Pr4}=e_{zr}\times I_P$$

Wherein, $B_{Prx}$, $B_{Pry}$, and $B_{Prz}$ are direct current and polarization magnetic field components in x, y, and z directions of a point r underground, $B_{Pr1}$-$B_{Pr4}$ are magnetic fields generated by four sides of the direct current transmitting coil, and $e_{xr}$, $e_{yr}$, and $e_{zr}$ are unit magnetic fluxes in x, y, and z directions, respectively;

The radio frequency excitation magnetic field excited by the alternating current transmitting coil at a point r underground is expressed as:

$$B_{Arx}=B_{Ar1}+B_{Ar3}=e_{xr}\times I_A$$

$$B_{Ary}=B_{Ar2}+B_{Ar4}=e_{yr}\times I_A$$

$$B_{Arz}=B_{Ar1}+B_{Ar2}+B_{Ar3}+B_{Ar4}=e_{zr}\times I_A$$

Wherein, $B_{Axr}$, $B_{Ary}$, and $B_{Arz}$ are alternating current excitation magnetic field components in x, y, and z directions of a point r underground, and $B_{Ar1}$-$B_{Ar4}$ are magnetic fields generated by four sides of the alternating current transmitting coil, respectively.

Further, step 21 and step 22 are as follows:

Step 21: obtaining the direct current pre-polarization magnetic field $B_P$ of the underground space from step 12, after obtaining the $B_P$ distribution, determining the distribution of underground net magnetization intensity $M_{Bp}$ after fully polarized based on a relationship between the net magnetization intensity and the magnetic field:

$$M_{Bp} = \frac{NG_m^2 h_q^2}{4kT} B_p$$

Wherein, N is an number of hydrogen atoms per unit volume, $G_m$ is the Landé factor, $h_q$ is the planck constant, k is the Boltzmann constant, and T is an absolute temperature;

Calculating a total magnetization intensity M of underground hydrogen atoms based on the net magnetization intensity enhanced by an excitation of the direct current transmitting coil obtained:

$$M=M_{Bp}+M_0$$

Wherein, $M_0$ is a magnetization intensity of a geomagnetic field;

Step 22: obtaining a radio frequency excitation magnetic field $B_A$ of the underground space from step 12, calculating a vertical component of the effective radio frequency excitation magnetic field after obtaining a $B_A$ distribution:

$$\alpha_L = \frac{1}{\sqrt{2}}\sqrt{|B_A|^2 + |(B_A)^2|}$$

$$\beta = \text{sign}[i\hat{b}_0 \cdot (B_A \times B_A^*)]\frac{1}{\sqrt{2}}\sqrt{|B_A|^2 - |(B_A)^2|}$$

$$|B_T^+(r)| = \frac{1}{2}I_A(\alpha_L - \beta)$$

Wherein, $\alpha_L$ is a long axis component of an elliptical polarization field of a radio frequency excitation field, $\beta$ is a short axis component of the elliptical polarization field of the radio frequency excitation field, $|B_T^+(r)|$ is the vertical component of the effective radio frequency excitation magnetic field, i is an unit vector, $\hat{b}_0$ is a direction vector of the geomagnetic field, $B_A^*$ is an adjugate matrix, and $I_A$ is the excitation current of the radio frequency excitation magnetic field;

Then, according to relationships between the flipping angle of hydrogen atoms and the vertical component of the effective radio frequency excitation magnetic field, the excitation current and a gyromagnetic ratio of hydrogen atoms, the flipping angle of hydrogen atoms is calculated:

$$\frac{d\theta}{dt} = -\gamma|B_T^+(r)|I_A$$

Wherein, $\gamma$ is a gyromagnetic ratio of hydrogen atoms, and $$\frac{d\theta}{dt}$$

is a change rate of the flipping angle of hydrogen atoms.

Compared with the existing technology, the advantageous effects of the present disclosure are:

The present disclosure adopts a concentric arrangement of a direct current transmitting coil and an alternating current transmitting coil to form a transmitting coil group, replacing the traditional single alternating current transmitting coil. Through the change of magnetization intensity caused by alternating excitation, the direct current emission time, alternating current emission time and emission interval time are adjusted, and the magnetization intensity is controlled to be gradually accumulated and stabilized in a certain range, thus improving the macro magnetization vector of hydrogen atoms. The single pulse emission time of the alternating excitation emission mode provided by the present disclosure is within 1 second, which can effectively improve the detection efficiency. The present disclosure achieves the effect of simultaneously improving the signal-to-noise ratio of surface nuclear magnetic resonance detection signals and enhancing detection efficiency.

DESCRIPTION OF EMBODIMENTS

In order to further clarify the purpose, technical solution, and advantages of the present disclosure, the following will provide a detailed explanation of the present disclosure in conjunction with the accompanying drawings and embodiments. It should be understood that the specific embodiments described herein are only for explaining the present disclosure and are not intended to limit the present disclosure.

The specific implementation of the present disclosure will be described in detail below in conjunction with specific embodiments.

Figure 1:
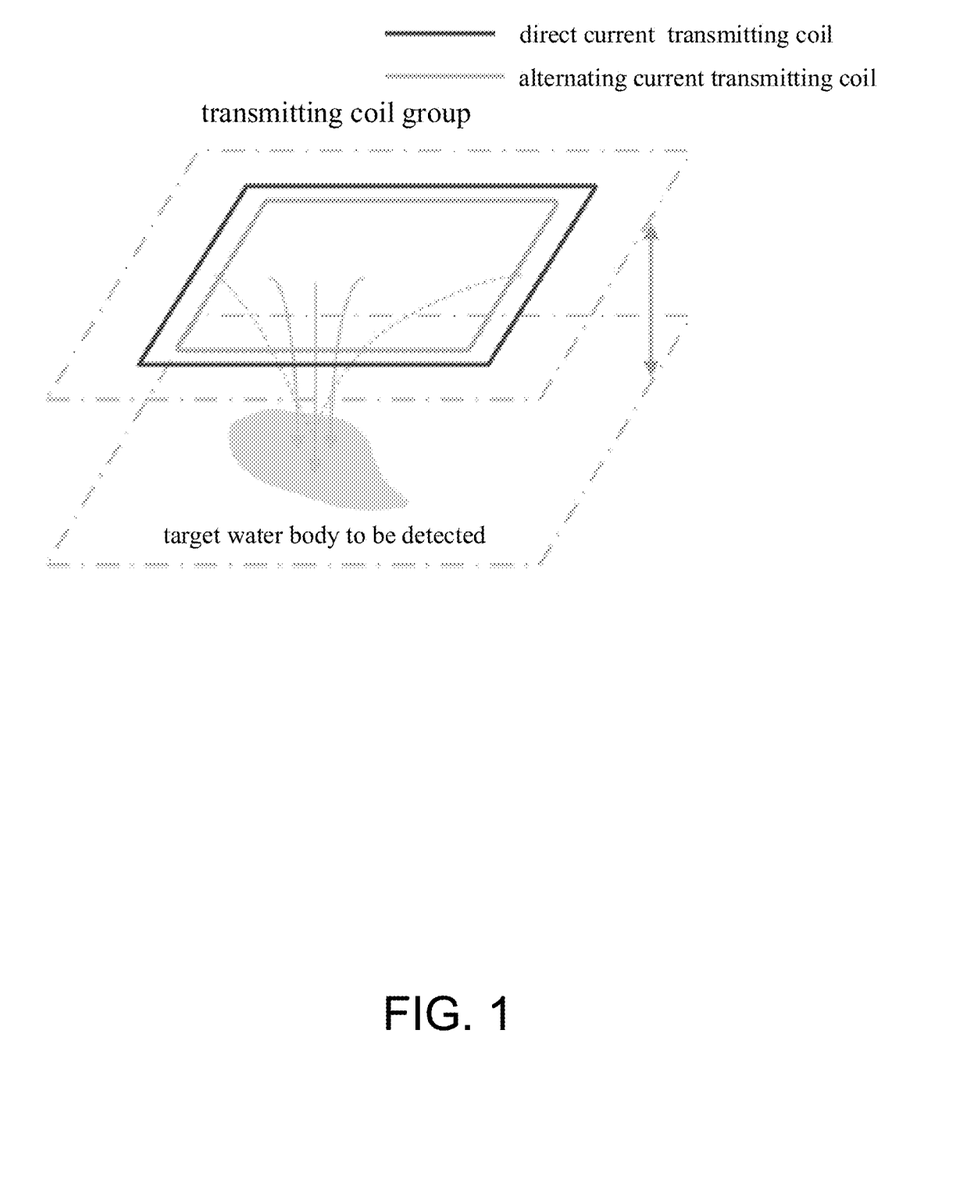
FIG. 1 is a schematic diagram of the detection of an alternating current coil group and a direct current coil group in the present disclosure.
Figure 2:
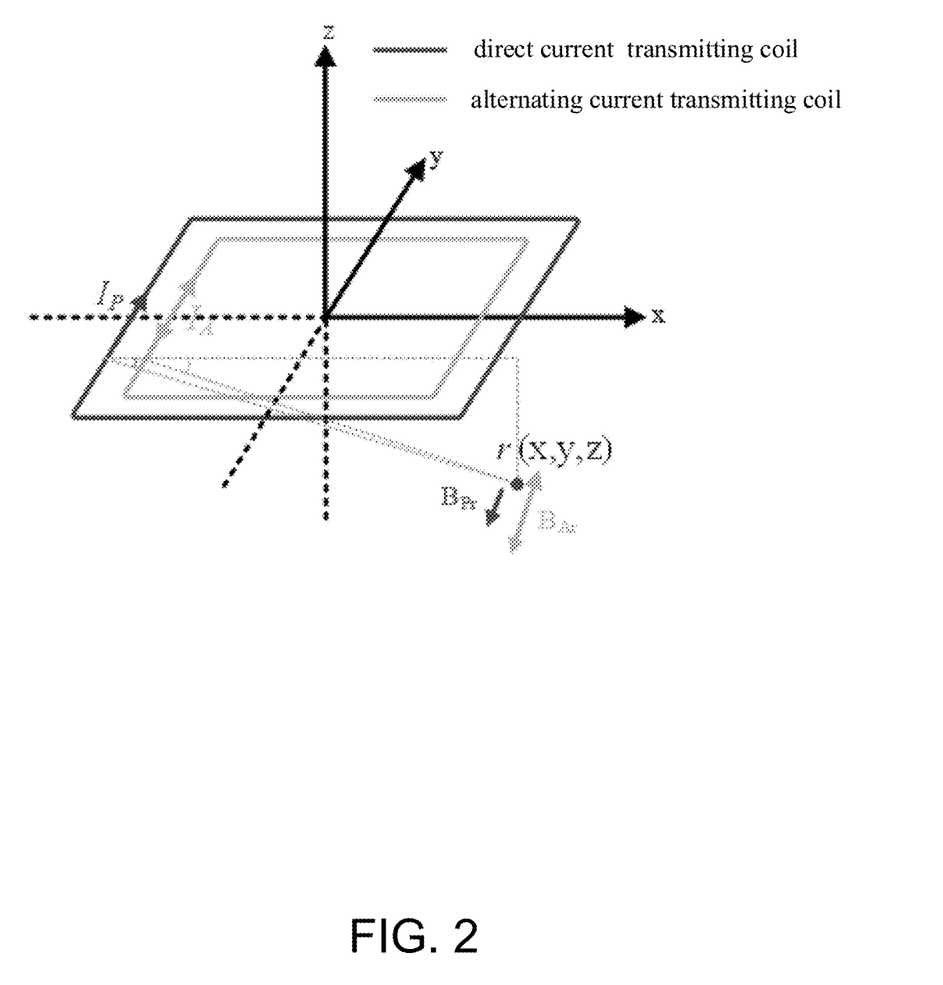
FIG. 2 is a schematic diagram of three-dimensional magnetic field calculations of an alternating current coil and a direct current coil in the present disclosure.
Figure 3:
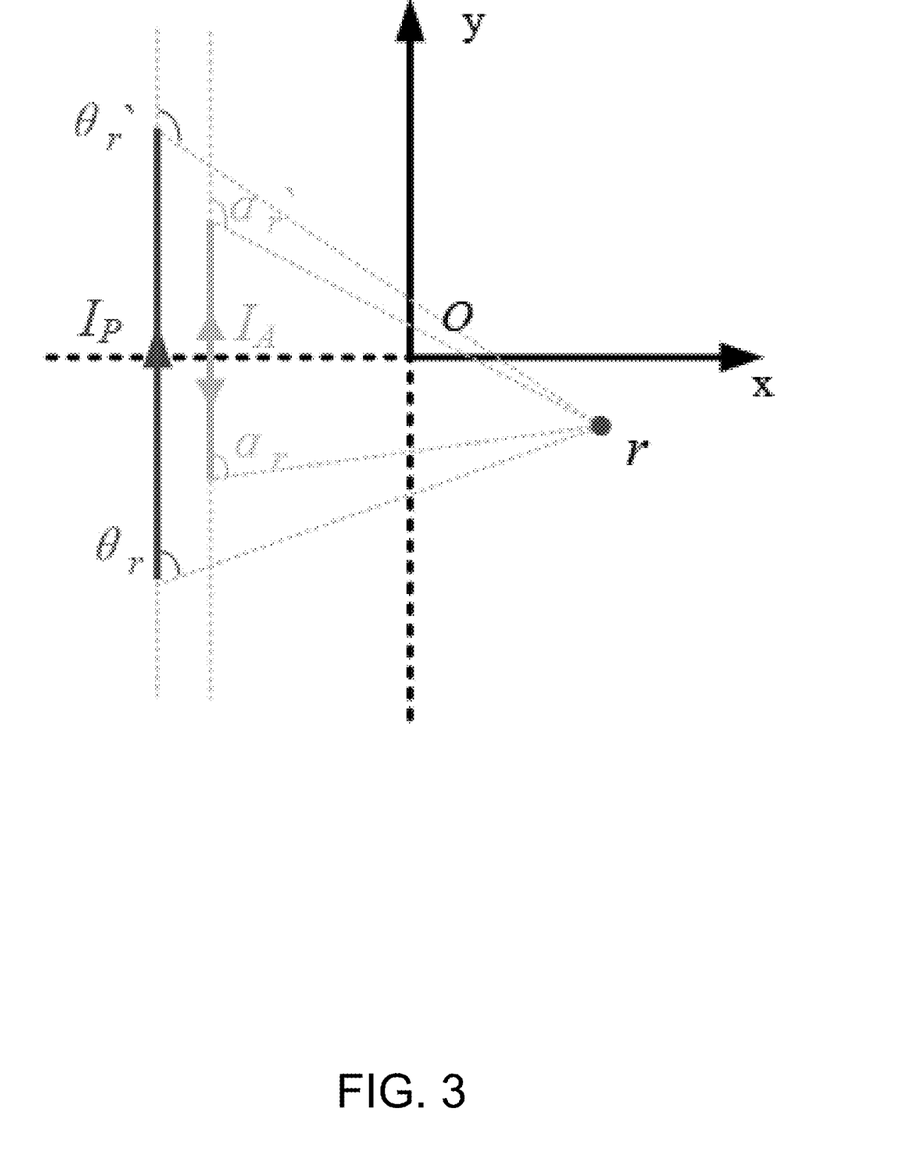
FIG. 3 is a schematic diagram of the decomposition of edge current of the coil in the present disclosure.

A high-efficiency and high signal-to-noise ratio surface nuclear magnetic resonance detection method is provided in one embodiment of the present disclosure. The method is based on a set of transmitting coil group consisting of a direct current transmitting coil and an alternating current transmitting coil, as shown in FIG. 1. Two coils are laid on the ground in a center-coincidence manner, and the target water body to be detected is under the arrangement area of the coil group. The direct current transmitting coil and the alternating current transmitting coil are arranged in a concentric pattern. During detection, the method provided in the present disclosure is used to control the duration and the interval time of current emission of direct current and alternating current in the transmitting coil group, thereby controlling the macroscopic magnetization intensity of the detected target water body to increase and dynamically stabilize within a certain range, ultimately achieving the goal of improving the signal-to-noise ratio by taking into account the amplitude of the detected signal. The method includes the following steps:

Step 1: calculate the direct current pre-polarization magnetic field generated by the direct current transmitting coil in the underground space and the radio frequency excitation magnetic field generated by the alternating current transmitting coil in the underground space;

Step 2: calculate the changes in underground magnetization intensity under the alternating action of direct current pre-polarization magnetic field and radio frequency excitation magnetic field;

Step 1 includes the following steps:

Step 11: calculate the magnetic field generated by the current passing through the coil: calculate the magnetic field distribution according to Biot-Savart Law, as shown in FIG. 2 and FIG. 3. FIG. 2 is a schematic diagram of the three-dimensional magnetic field calculation of the coil group. When current is passed through the direct current coil and the alternating current coil, the magnetic induction intensity $B_P$ and $B_A$ at any point r underground can be calculated. FIG. 3 is a schematic diagram of the current decomposition of the edge current of the coil, for a direct current transmitting coil and an alternating current transmitting coil, the field intensity generated by the four edges are superimposed in space to calculate the magnetic induction intensity of the coil at any point r underground. Thus, the magnetic induction intensity $B_P$ and $B_A$ at any underground point can be calculated according to FIG. 2.

The magnetic field formed by the edge current at any point r in space in a direct current transmitting coil (with a side length of 2a) is expressed as:

$$|B_{Pr}| = \frac{\mu_0 I_P}{4\pi a}(\cos\theta_r - \cos\theta'_r)$$

Wherein, $B_{Pr}$ is the pre-polarization magnetic field intensity at point r in space, $\mu_0$ is the magnetic permeability, $I_P$ is the excitation current of the direct current pre-polarization magnetic field, $\theta_r$ and $\theta'_r$ are the angles between point r and the two ends of a wire.

The magnetic field formed by the edge current at any point r in space in the alternating current transmitting coil (with a side length of 2c) is expressed as:

$$|B_{Ar}| = \frac{\mu_0 I_A}{4\pi c}(\cos\alpha_r - \cos\alpha'_r)$$

Wherein, $B_{Ar}$ is the excitation field intensity at point r in space, $I_A$ is the excitation current of the radio frequency excitation magnetic field, $\alpha$ and $\alpha'_r$ are the angles between point r and the two ends of a wire.

Step 12: calculate the overall magnetic field generated by the coil: based on the results calculated in step 11, the direct current pre-polarization magnetic field excited by the direct current transmitting coil at an underground point r is expressed as:

$$B_{Prx} = B_{Pr1} + B_{Pr3} = e_{xr} \times I_P$$

$$B_{Pry} = B_{Pr2} + B_{Pr4} = e_{yr} \times I_P$$

$$B_{Prz} = B_{Pr1} + B_{Pr2} + B_{Pr3} + B_{Pr4} = e_{zr} \times I_P$$

Wherein, $B_{Prx}$, $B_{Pry}$, and $B_{Prz}$ are the direct current and polarization magnetic field components in the x, y, and z directions of a point r underground, $B_{Pr1}$-$B_{Pr4}$ are the magnetic fields generated by the four sides of the direct current transmitting coil, $e_{xr}$, $e_{yr}$, and $e_{zr}$ are the unit magnetic fluxes in the x, y, and z directions, respectively. The radio frequency excitation magnetic field excited by the alternating current transmitting coil at a point r underground is expressed as:

$$B_{Arx} = B_{Ar1} + B_{Ar3} = e_{xr} \times I_A$$

$$B_{Ary} = B_{Ar2} + B_{Ar4} = e_{yr} \times I_A$$

$$B_{Arz} = B_{Ar1} + B_{Ar2} + B_{Ar3} + B_{Ar4} = e_{zr} \times I_A$$

Wherein, $B_{Arx}$, $B_{Ary}$, and $B_{Arz}$ are the alternating current excitation magnetic field components in the x, y, and z directions of the point r underground, and $B_{Ar1}$-$B_{Ar4}$ are the magnetic fields generated by the four sides of the alternating current transmitting coil, respectively.

The direct current transmitting coil enhances the magnetization vector of underground space hydrogen atoms by generating a constant magnetic field, while the alternating current transmitting coil flips the spin direction of underground hydrogen atoms by generating a radio frequency magnetic field.

Step 2 includes the following steps:

Step 21: calculate the enhancement of hydrogen atoms magnetization by direct current pre-polarization magnetic field: obtain the direct current pre-polarization magnetic field $B_P$ of the underground space from step 12, after obtaining the distribution of the direct current pre-polarization magnetic field $B_P$, determine the fully polarized underground $M_{Bp}$ distribution based on the relationship between net magnetization intensity and magnetic field:

$$M_{Bp} = \frac{NG_m^2 h_q^2}{4kT} B_p$$

Wherein, N is the number of hydrogen atoms per unit volume, $G_m$ is the Land é factor, $h_q$ is the Planck constant, k is the Boltzmann constant, and T is the absolute temperature.

Calculate the total magnetization intensity M of underground hydrogen atoms based on the net magnetization intensity enhanced by the excitation of the direct current transmitting coil obtained:

$$M = M_{Bp} + M_0$$

Wherein, $M_0$ is the magnetization intensity of the geomagnetic field.

Step 22: calculate the flipping effect of the radio frequency excitation magnetic field on hydrogen atoms: obtain the radio frequency excitation magnetic field $B_A$ in the underground space from step 12, after obtaining the $B_A$ distribution, calculate the vertical component of the effective radio frequency excitation magnetic field:

$$\alpha_L = \frac{1}{\sqrt{2}} \sqrt{|B_A|^2 + |(B_A)^2|}$$

$$\beta = \text{sign}[i\hat{b}_0 \cdot (B_A \times B_A^*)] \frac{1}{\sqrt{2}} \sqrt{|B_A|^2 - |(B_A)^2|}$$

$$|B_T^+(r)| = \frac{1}{2} I_A (\alpha_L - \beta)$$

Wherein, $\alpha_L$ is the long axis component of the elliptical polarization field of the radio frequency excitation magnetic field, $\beta$ is the short axis component of the elliptical polarization field of the radio frequency excitation magnetic field, $|B_T^+(r)|$ is the vertical component of the effective radio frequency excitation magnetic field, i is the unit vector, $\hat{b}_0$ is the direction vector of the geomagnetic field, $B_A^*$ is the adjugate matrix, and $I_A$ is the excitation current of the radio frequency excitation magnetic field.

Then, according to relationships between the flipping angle of hydrogen atoms and the vertical component of the effective radio frequency excitation magnetic field, the excitation current and a gyromagnetic ratio of hydrogen atoms, the flipping angle of hydrogen atoms is calculated:

$$\frac{d\theta}{dt} = -\gamma |B_T^+(r)| I_A$$

Wherein, $\gamma$ is the gyromagnetic ratio of hydrogen atoms, and $$\frac{d\theta}{dt}$$

is the change rate of the flipping angle of hydrogen atoms.

Figure 4:
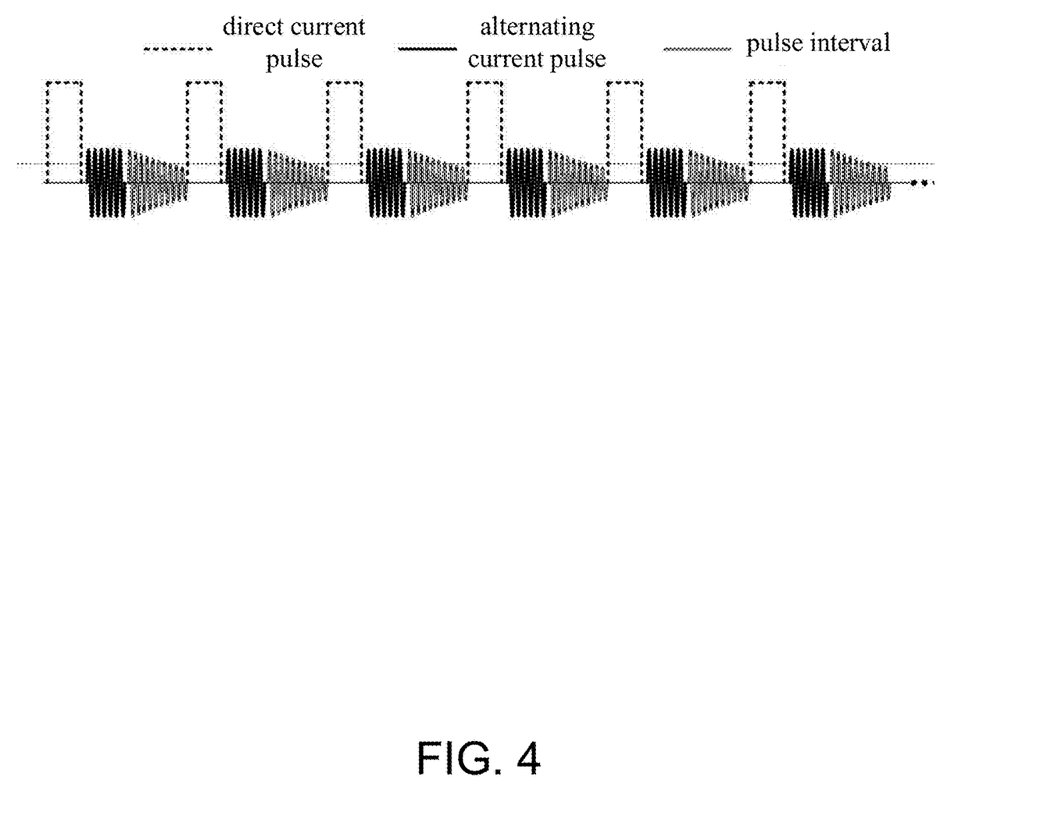
FIG. 4 is a schematic diagram of the alternating pulse sequence in the present disclosure.
Figure 5:
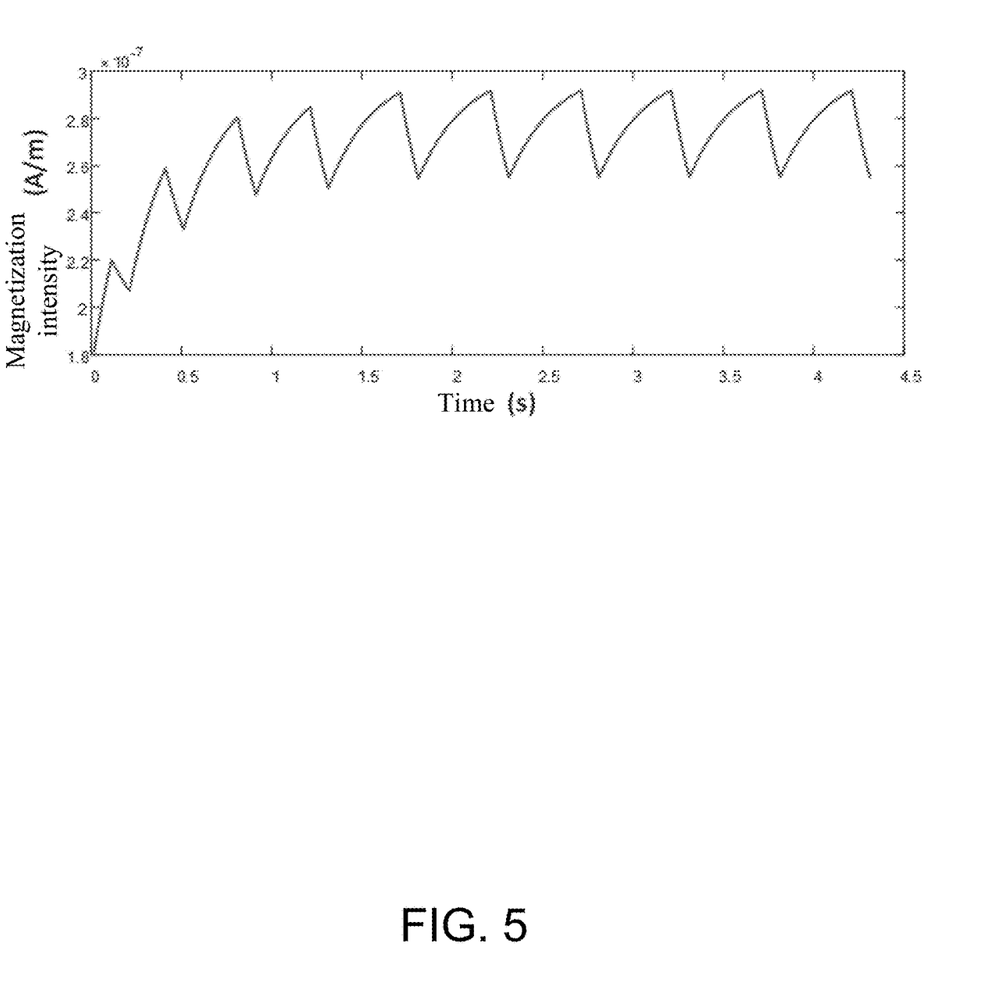
FIG. 5 is a schematic diagram of the macroscopic magnetization change of hydrogen atoms in the present disclosure.

Step 23: calculate the changes in underground magnetization intensity:

FIG. 4 is a schematic diagram of alternating pulse in the present disclosure, in the whole pulse sequence, the direct current pulse, alternating current pulse and pulse interval are alternated, wherein the duration of direct current pulse is in the range of several hundred ms, the duration of alternating current pulse is in the range of tens of ms, the pulse interval is in the range of tens of ms, and the time of a single set of pulses is within 1 second. As shown in FIG. 4, based on different direct current emission current times and alternating current emission current times, the enhancement degree of direct current pre-polarization magnetic field on underground magnetization intensity and the flipping effect of radio frequency excitation magnetic field on hydrogen atoms are calculated, and the curve of underground magnetization intensity change is obtained (FIG. 5). FIG. 5 shows the effect of improving the magnetization intensity of underground hydrogen atoms achieved by using the alternating detection pulse in the present disclosure. By controlling the direct current emission time, the alternating current emission time, and the pulse emission interval time, the macroscopic magnetization intensity can be maximized within 2 seconds and dynamically stabilized within a certain range.

Embodiment 1: in Shaoguo Town, Changchun City, the high-efficiency and high signal-to-noise ratio surface nuclear magnetic resonance detection method provided by the present disclosure is used for practical application in field. The specific implementation steps are as follows:

In the detection area, a direct current transmitting coil and a alternating current transmitting coil are arranged in a concentric manner as shown in FIG. 1, along with the corresponding receiving coil, debugging the instrument. The hydrogeological conditions of the detect point are known. Based on the existing geological information, according to steps 1 and 2 mentioned above, calculate the change of magnetization intensity based on the set direct current pulse emission time, alternating current pulse emission time, and pulse interval time, and estimate the signal reception situation.

After completing the calculation of the change curve of the magnetization intensity of underground hydrogen atoms, the groundwater under the detect point is detected. Set the range of the transmitting pulse moment to 0.10 A·s to 10 A·s, with a total of 32 pulse moments, 32 stacking times, and an acquisition frequency of 31.25 kHz. After setting, start the surface nuclear magnetic resonance detector until the detection at the detect point is completed, and save the detected data.

Figure 6:
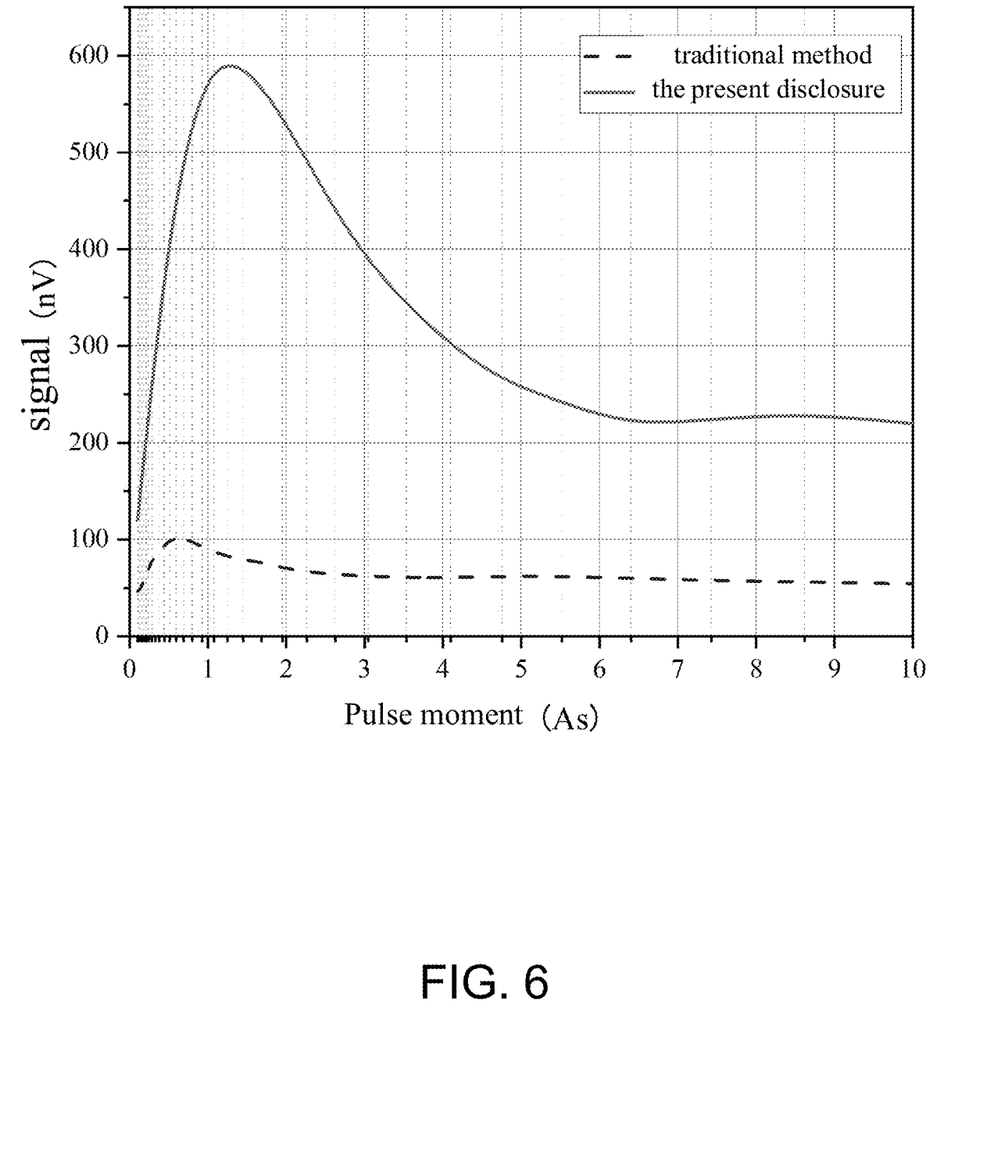
FIG. 6 is a detection curve of the traditional detection method and the high-efficiency and high signal-to-noise ratio detection method provided by the present disclosure.

After the test is completed, the data collected by the receiver is subjected to signal processing to obtain the initial amplitude at each pulse moment, and compared with the signal obtained by traditional methods to draw a detection curve (FIG. 6). Comparing the signal initial amplitudes displayed by the two curves, it can be seen that the signal amplitude detected by the method provided by the present disclosure is much higher than that of traditional methods, and the pulse emission time of the present disclosure is much shorter than that of traditional detection methods, proving that the method provided by the present disclosure can effectively improve the amplitude of groundwater detection signals, thereby improving the signal-to-noise ratio of detection signals, and at the same time, the detection efficiency is also higher than that of traditional methods.

The above are only preferred embodiments of the present disclosure. It should be understood that for those skilled in the art, several modifications and improvements can be made without departing from the concept of the present disclosure, which should also be considered as the scope of the present disclosure. These will not affect the effectiveness of the implementation of the present disclosure and the practicality of the disclosure.

What is claimed is:

1. A ground nuclear magnetic resonance detection method, wherein the method is based on a set of transmitting coil group consisting of a direct current transmitting coil and an alternating current transmitting coil, and the direct current transmitting coil and the alternating current transmitting coil are arranged in a concentric pattern on a surface of ground; the method comprises the following steps:
step 1: calculating a direct current pre-polarization magnetic field generated by the direct current transmitting coil in underground space and a radio frequency excitation magnetic field generated by the alternating current transmitting coil in the underground space;
step 2: calculating changes of underground magnetization intensity under an alternating action of the direct current pre-polarization magnetic field and the radio frequency excitation magnetic field;
wherein step 1 comprises the following steps:
step 11: calculating a magnetic field generated by current passing through the direct current transmitting coil and the alternating current transmitting coil;
step 12: calculating an overall magnetic field generated by the direct current transmitting coil and the alternating current transmitting coil; the direct current transmitting coil enhances a magnetization vector of hydrogen atoms in the underground space by generating a constant magnetic field, while the alternating current transmitting coil flips a spin direction of the hydrogen atoms underground by generating a radio frequency magnetic field;
step 2 comprises the following steps:
step 21: calculating an enhancement of magnetization intensity on the hydrogen atoms by the direct current pre-polarization magnetic field;
step 22: calculating a flipping effect of the radio frequency excitation magnetic field on the hydrogen atoms;
step 23: calculating the changes of the underground magnetization intensity: based on different preset direct current emission current times and alternating current emission current times, calculating a degree of enhancement of the underground magnetization intensity by the direct current pre-polarization magnetic field and the flipping of the hydrogen atoms by the radio frequency excitation magnetic field, and obtaining a curve of underground magnetization intensity changes; in a whole pulse sequence, direct current pulse, alternating current pulse and pulse interval are alternated, wherein a duration of the direct current pulse is in a range of several hundred ms, a duration of the alternating current pulse is in a range of tens of ms, the pulse interval is in the range of tens of ms, and a time of a single set of pulses is within 1 second, by adjusting emission time of the direct current pulse, emission time of the alternating current pulse, and the pulse interval time, controlling the underground magnetization intensity to gradually accumulate and stabilize within a certain range.

2. The ground nuclear magnetic resonance detection method according to claim 1, wherein step 11 and step 12 comprise steps as follows:
step 11: calculating a magnetic field distribution according to Biot-Savart law, a magnetic field formed by an edge current at any point r in space in the direct current transmitting coil with a side length of 2A is expressed as:

$$|B_{Pr}| = \frac{\mu_0 I_P}{4\pi A}(\cos\theta_r - \cos\theta_r');$$

wherein, 2A is the side length of the direct current transmitting coil; $B_{Pr}$ is a pre-polarization magnetic field intensity at point r in space, $\mu_0$ is a magnetic permeability, $I_P$ is an excitation current of the direct current pre-polarization magnetic field, and $\theta_r$ and $\theta_r'$ are angles between point r and two ends of a wire;
a magnetic field formed by an edge current at any point r in space in the alternating current transmitting coil with a side length of 2C is expressed as:

$$|B_{Ar}| = \frac{\mu_0 I_A}{4\pi C}(\cos\alpha_r - \cos\alpha_r');$$

wherein, 2C is the side length of the the alternating current transmitting coil. $B_{Ar}$ is an excitation field intensity at point r in space, $I_A$ is an excitation current of the radio frequency excitation magnetic field, and $\alpha_r$ and $\alpha_r'$ are angles between point r and two ends of a wire;
step 12: based on a result calculated in step 11, the direct current pre-polarization magnetic field excited by the direct current transmitting coil at a point r underground is expressed as:

$$B_{Prx}=B_{Pr1}+B_{Pr3}=e_{xr}\times I_P;$$

$$B_{Pry}=B_{Pr2}+B_{Pr4}=e_{yr}\times I_P;$$

$$B_{Prz}=B_{Pr1}+B_{Pr2}+B_{Pr3}+B_{Pr4}=e_{zr}\times I_P;$$

wherein, $B_{Prx}$, $B_{Pry}$, and $B_{Prz}$ are direct current and polarization magnetic field components in x, y, and z directions of a point r underground, $B_{Pr1}$-$B_{Pr4}$ are magnetic fields generated by four sides of the direct current transmitting coil, and $e_{xr}$, $e_{yr}$, and $e_{zr}$ are unit magnetic fluxes in x, y, and z directions, respectively;
the radio frequency excitation magnetic field excited by the alternating current transmitting coil at a point r underground is expressed as:

$$B_{Arx}=B_{Ar1}+B_{Ar3}=e_{xr}\times I_A;$$

$$B_{Ary}=B_{Ar2}+B_{Ar4}=e_{yr}\times I_A;$$

$$B_{Arz}=B_{Ar1}+B_{Ar2}+B_{Ar3}+B_{Ar4}=e_{zr}\times I_A;$$

wherein, $B_{Arx}$, $B_{Ary}$, and $B_{Arz}$ are alternating current excitation magnetic field components in x, y, and z directions of a point r underground, and $B_{Ar1}$-$B_{Ar4}$ are magnetic fields generated by four sides of the alternating current transmitting coil, respectively.

3. The ground nuclear magnetic resonance detection method according to claim 2, wherein step 21 and step 22 comprise steps as follows:
step 21: obtaining the direct current pre-polarization magnetic field $B_P$ of the underground space from step 12, after obtaining a distribution of the direct current pre-polarization magnetic field $B_P$, determining a distribution of underground net magnetization intensity $M_{Bp}$ after fully polarized based on a relationship between the underground net magnetization intensity and the magnetic field:

$$M_{Bp} = \frac{NG_m^2 h_q^2}{4kT} B_p;$$

wherein, N is an number of hydrogen atoms per unit volume, $G_m$ is the Landé factor, $h_q$ is the Planck constant, k is the Boltzmann constant, and T is an absolute temperature;

calculating a total magnetization intensity M of the hydrogen atoms underground based on the under round net magnetization intensity enhanced by an excitation of the direct current transmitting coil obtained:

$$M = M_{Bp} + M_0;$$

wherein, $M_0$ is a magnetization intensity of a geomagnetic field;

step 22: obtaining a radio frequency excitation magnetic field $B_A$ of the underground space from step 12, calculating a vertical component of the effective radio frequency excitation magnetic field after obtaining a $B_A$ distribution:

$$\alpha_L = \frac{1}{\sqrt{2}} \sqrt{|B_A|^2 + |(B_A)^2|};$$

$$\beta = \text{sign}[i\hat{b}_0 \cdot (B_A \times B_A^*)] \frac{1}{\sqrt{2}} \sqrt{|B_A|^2 - |(B_A)^2|};$$

$$|B_T^+(r)| = \frac{1}{2} I_A (\alpha_L - \beta);$$

wherein, $\alpha_L$ is a long axis component of an elliptical polarization field of a radio frequency excitation field, $\beta$ is a short axis component of the elliptical polarization field of the radio frequency excitation field, $|B_T^+(r)|$ is the vertical component of the effective radio frequency excitation magnetic field, i is an unit vector, $\hat{b}_0$ is a direction vector of the geomagnetic field, $B_A^*$ is an adjugate matrix, and $I_A$ is the excitation current of the radio frequency excitation magnetic field;

then, according to relationships between a flipping angle of the hydrogen atoms and the vertical component of the effective radio frequency excitation magnetic field, the excitation current and a gyromagnetic ratio of the hydrogen atoms, the flipping angle of hydrogen atoms is calculated:

$$\frac{d\theta_{ang}}{dt} = -\gamma |B_T^+(r)| I_A;$$

wherein, $\gamma$ is the gyromagnetic ratio of the hydrogen atoms, and $$\frac{d\theta_{ang}}{dt}$$

is a change rate of the flipping angle of the hydrogen atoms.

\* \* \* \* \*